US008237768B2

United States Patent
Ahmad et al.

(10) Patent No.: US 8,237,768 B2
(45) Date of Patent: Aug. 7, 2012

(54) METHOD AND SYSTEM FOR CONTROLLING MULTIMEDIA COMMUNICATION QUALITY IN A HANDHELD DEVICE

(75) Inventors: Ashraf M. A. Ahmad, Hsinchu (TW); Chia-Ching Lin, Chaojhou Township, Pingtung County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1425 days.

(21) Appl. No.: 11/826,077

(22) Filed: Jul. 12, 2007

(65) Prior Publication Data
US 2008/0013613 A1    Jan. 17, 2008

(30) Foreign Application Priority Data
Jul. 13, 2006    (TW) ............................. 95125615 A

(51) Int. Cl.
*H04N 7/14* (2006.01)
(52) U.S. Cl. ................ 348/14.02; 348/14.01; 348/14.13

(58) Field of Classification Search .... 348/14.01–14.16; 375/221, 259, 377; 370/464, 431, 437
See application file for complete search history.

(56) References Cited

U.S. PATENT DOCUMENTS

| | | | | |
|---|---|---|---|---|
| 6,154,489 A * | 11/2000 | Kleider et al. | ............... | 375/221 |
| 7,120,162 B1 * | 10/2006 | Katibian et al. | ............. | 370/464 |
| 2002/0075159 A1 * | 6/2002 | DeLine et al. | ............. | 340/815.4 |
| 2004/0077349 A1 * | 4/2004 | Barak et al. | ................... | 455/436 |
| 2005/0265383 A1 | 12/2005 | Melpignano et al. | ......... | 370/465 |
| 2008/0158333 A1 * | 7/2008 | Krisbergh et al. | ......... | 348/14.01 |

* cited by examiner

*Primary Examiner* — Melur Ramakrishnaiah
(74) *Attorney, Agent, or Firm* — Bacon & Thomas, PLLC

(57) ABSTRACT

The invention provides a system and method for controlling multimedia communication quality in a handheld device. The handheld device receives and transmits multimedia data via a wireless network. First, the predetermined video coding parameters are used to code a video stream and transmit the coded video stream via the wireless network, and receive a multimedia data via the wireless network. Next, the quality of the wireless network is detected. When the quality is poor, the video coding parameters are changed. Finally, the quality of received multimedia data is detected. When the quality of received multimedia data is poor, the video coding parameters are changed.

12 Claims, 2 Drawing Sheets

METHOD AND SYSTEM FOR CONTROLLING MULTIMEDIA COMMUNICATION QUALITY IN A HANDHELD DEVICE

BACKGROUND OF THE INVENTION

1. Field of the Invention

The invention relates to the technical field of quality of service (QoS) control in communication and, more particularly, to a system and method for controlling multimedia communication quality in a handheld device.

2. Description of Related Art

Wireless communication systems gradually change from analog wireless communication systems, such as Advanced Mobile Phone System (AMPS), and Total Access Communication System (TACS), to digital wireless communication systems, such as Global System for Mobile Communications (GSM), Code Division Multiple Access (CDMA)), and Time Division Multiple Access (TDMA). The first-generation and the second-generation wireless communication systems are replaced gradually by the third-generation wireless communication systems. The first-generation wireless communication systems essentially provide voice services. In addition to the voice services, the second-generation wireless communication systems essentially provide data communications. The third-generation (3G) wireless communication systems essentially provide various contents such as multimedia and video messages. In the 3G systems, the Wideband CDMA (WCDMA) systems have the capability of high-speed wireless linking and accordingly are considered as a platform of new applications such as a videoconference.

The videoconference is considered as a killer application of driving the 3G wireless communication affairs. US publication 2005/0265383 entitled "Method and system for Communicating Video Data in a Packet-Switched Network, Related Network and Computer Program Product Therefor" has disclosed sending video data in a radio channel of a packet-switched network. However, due to the packet-switched network, it cannot provide a quality of service (QoS) guarantee. Namely, the video quality sent in such a packet-switched network cannot be ensured.

Currently, only the circuit-switched protocol, i.e., 3G-234m, can provide a possible solution for carrying out a videoconference of wireless network. However, the conventional video coding (such as H.263) typically uses a fixed output stream bit-rate and fixed coding parameters, which is not suitable for a radio channel due to noise interference and limited bandwidth. In addition, the 3G-324m protocol does not provide the mechanism of video QoS guarantee. Hence, it is desired to have a technical improvement on the prior videoconference of wireless network.

SUMMARY OF THE INVENTION

An object of the invention is to provide a system and method for controlling multimedia communication quality in a handheld device, which can overcome the poor QoS in the prior videoconference of wireless network.

Another object of the invention is to provide a system and method for controlling multimedia communication quality in a handheld device, which can overcome the problem that the conventional video coding using a fixed output stream bit-rate and fixed coding parameters is not suitable for a radio channel with noise interference and limited bandwidth.

A further object of the invention is to provide a system and method for controlling multimedia communication quality in a handheld device, which can provide the guarantee of the mechanism of video QoS in the videoconference of a wireless network.

In accordance with one aspect of the present invention, there is provided a system for controlling multimedia communication quality in a handheld device. The system includes a transceiver module, a network analysis and video control module, an encoder and a video transfer module. The transceiver module is connected to an air-interface in order to send or receive data to or from the air-interface. The network analysis and video control module is connected to the transceiver module in order to produce a video coding control signal based on a quality of service (QoS) information. The video coding control signal has a first state and a second state. The first state indicates that the air-interface has a good communication quality. The second state indicates that the air-interface has a poor communication quality. The encoder is connected to the network analysis and video control module and receives a non-coded video datastream for further compressing and coding based on video coding parameters that are adjusted in accordance with the video coding control signal, to thereby produce a transport datastream. The video transfer module is connected between the encoder and the transceiver module in order to pack the transport datastream to become a transfer format of the transceiver module for being transferred by the transceiver module.

In accordance with another aspect of the present invention, there is provided a method for controlling multimedia communication quality in a handheld device. The handheld device sends or receives multimedia data via a wireless network. The method includes the steps of: (A) using predetermined video coding parameters to perform a compressing and coding on a non-coded video datastream and accordingly produce a transport datastream for sending via the wireless network, and receiving multimedia data via the wireless network; (B) detecting a quality of the wireless network such that, when the quality is poor, the video coding parameters used to compress and code the non-coded video datastream are changed by reducing video resolution or video frame per second to thereby reduce a size of video datastream with respect to the transport datastream; and (C) detecting a quality of received multimedia data such that, when the quality is poor, the video coding parameters used to compress and code the non-coded video datastream are changed by reducing video resolution or video frame per second to thereby reduce a size of video datastream with respect to the transport datastream.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
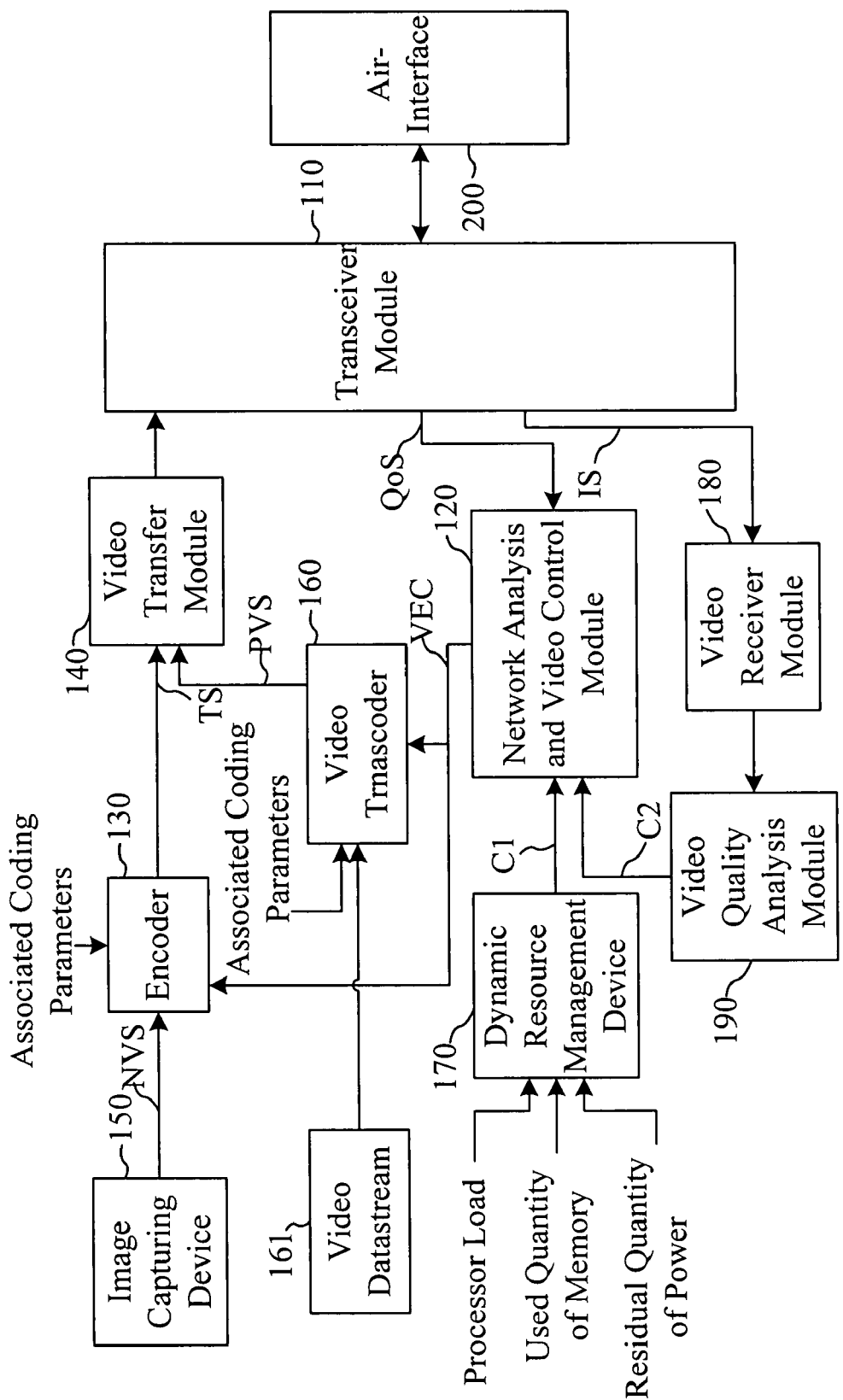
FIG. 1 is a block diagram of a system for controlling multimedia communication quality in a handheld device in accordance with the invention.

The video quality of service (QoS) plays an important role in a videoconference of wireless network. FIG. 1 is a block diagram of a system for controlling multimedia communication quality in a handheld device in accordance with the invention. As shown in FIG. 1, the system includes a transceiver module 110, a network analysis and video control module 120, an encoder 130, a video transfer module 140, an image capturing device 150, a video transcoder 160, a dynamic resource management device 170, a video receiver module 180 and a video quality analysis module 190.

As shown in FIG. 1, the transceiver module 110 is connected to an air-interface 200 in order to send data to the air-interface 200 or receive data from the air-interface 200. The transceiver module 110 also provides the information with the quality of service (QoS) of the air-interface 200. The air-interface 200 transmits and receives the packets via a wireless network.

The transceiver module 110 is preferably a 3G-324m transceiver module. The transceiver module 110 can perform the Time Division Multiplexing Circuit-Switched Protocol.

The network analysis and video control module 120 is connected to the transceiver module 120, and produces a video coding control signal VEC in accordance with QoS information. The video coding control signal VEC has a first state and a second state. The first state indicates that the air-interface 200 has a good communication quality. The second state indicates that the air-interface 200 has a poor communication quality.

In addition, the network analysis and video control module 120 can determine the network situation as a reference of the QoS information in accordance with a signal to noise ratio (SNR), bit error rate (BER), radio signal strength indicator (RSSI) or packet loss rate. For example, the module 120 can determine the QoS of the wireless network by comparing the packet loss rate with a first predetermined value. When the packet loss rate is greater than the first predetermined value, it is decided that the quality of wireless network is poor. When the packet loss rate is not greater than the first predetermined value, it is decided that the quality of wireless network is good. Alternatively, the module 120 can refer to the SNR. When the SNR is smaller than a second system threshold, it is determined that the radio signal transmitted in the wireless network is poor. Alternatively, the module 120 can refer to the BER. When the BER is greater than a third system threshold, it is decided that the reception of the radio signal is poor. The module 120 can refer to the RSSI. When the RSSI is smaller than a fourth system threshold, it is decided that the radio signal is in a poor situation.

When the module 120 decides that the wireless network is in a poor communication situation, the video coding control signal VEC is at the second state and the video coding parameters to be sent are changed. For example, the video resolution or video frame per second is reduced to allow the encoder 130 to perform a compressing and coding on the non-coded video datastream based on the video coding parameters changed, thereby reducing the size of the video datastream.

Conversely, when the module 120 determines that the wireless network is in a good communication situation, the video coding control signal VEC is at the first state and the default video coding parameters are applied to the encoder 130 to produce a transport datastream by performing a compressing and coding on the non-coded video datastream.

The image capturing device 150 is connected to the encoder 130 in order to capture an image and produce a non-coded video datastream NVS. The image capturing device 150 is preferably a charge coupled device (CCD) image sensor. In other embodiments, the image capturing device 150 can be a complementary metal oxide semiconductor (CMOS) image sensor.

The encoder 130 is connected between the network analysis and video control module 120 and the image capturing device 150. The encoder 130 receives the datastream NVS, and adjusts the video coding parameters based on the state of the video coding control signal VEC for reducing the frame rate and resolution so as to compress and code the datastream NVS. Thus, the transport stream TS is produced.

The encoder 130 preferably performs an H.263 compressing and coding. However, in other embodiments, the encoder 130 can perform an MPEG4 or H.264 compressing and coding.

The video transfer module 140 is connected between the encoder 130 and the transceiver module 110 in order to pack the transport datastream TS to become a transfer format of the transceiver module 110 for being transferred by the transceiver module 110.

The video transcoder 160 is connected to the network analysis and video control module 120 in order to adjust the video coding parameters in accordance with the state of the signal VEC, such that a pre-encoded video datastream 161 is transduced into a video datastream PVS with a different video resolution and frame rate.

When the signal VEC is at the first state, it indicates that the air-interface 200 has a good communication quality. In this case, the video transcoder 160 transduces the datastream 161 into a datastream PVS with a high video resolution and frame rate. When the signal VEC is at the second state, it indicates that the air-interface 200 has a poor communication quality. In this case, the video transcoder 160 transduces the datastream 161 into a datastream PVS with a low video resolution and frame rate.

The dynamic resource management device 170 is connected to the network analysis and video control module 120 for detecting the resources of the handheld device to thereby produce a first control signal C1. The resources of the handheld device include the processor load, the residual quantity of power and the used quantity of memory.

The first control signal C1 has a first resource state and a second resource state. The first resource state indicates that the handheld device has sufficient resources, and the second resource state indicates that the handheld device has insufficient resources. For example, when the processor load is lower than a load threshold, the used quantity of memory is lower than a memory use threshold, or the residual quantity of power is higher than a residual threshold, the first control signal C1 is at the first resource state to indicate that the handheld device has sufficient resources.

The module 120 adjusts the signal VEC based on the state of the first control signal C1 for accordingly adjusting the video coding parameters by the encoder 130 and the video transcoder 160.

The video receiver module 180 is connected to the transceiver module 110 in order to receive a video datastream IS received by the transceiver module 110 from the air-interface 200. The video quality analysis module 190 is connected between the video receiver module 180 and the network analysis and video control module 120 in order to produce a second control signal C2 based on the quality of a received video datastream IS. The quality of the video datastream IS includes frame-delay variation, bit error rate, and frame loss rate.

The second control signal C2 has a first video quality state and a second video quality state. The first video quality state indicates that the quality of the received datastream IS is good, and the second video quality state indicates that the quality of the received datastream IS is poor. For example, when the frame-delay variation is greater than a delay variation threshold, the bit error rate is greater than a threshold, or the frame loss rate is greater than a loss rate threshold, the second control signal C2 is at the second video quality state to indicate that the quality of the received datastream IS is poor.

The module 120 adjusts the signal VEC based on the state of the second control signal for accordingly adjusting the video coding parameters by the encoder 130 and the video transcoder 160.

In this embodiment, in addition to adjusting the video coding parameters based on the result determined by the network analysis and video control module 120 to thereby allow the encoder 130 to perform the compressing and coding on the non-coded video datastream, the system can also use the video transcoder 160 to further perform a video transducing on the video data coded by the encoder 130 based on the result determined by the network analysis and video control module 120 to thereby obtain a higher or lower video data rate which can meet with the communication quality required for the module 120.

Figure 2:
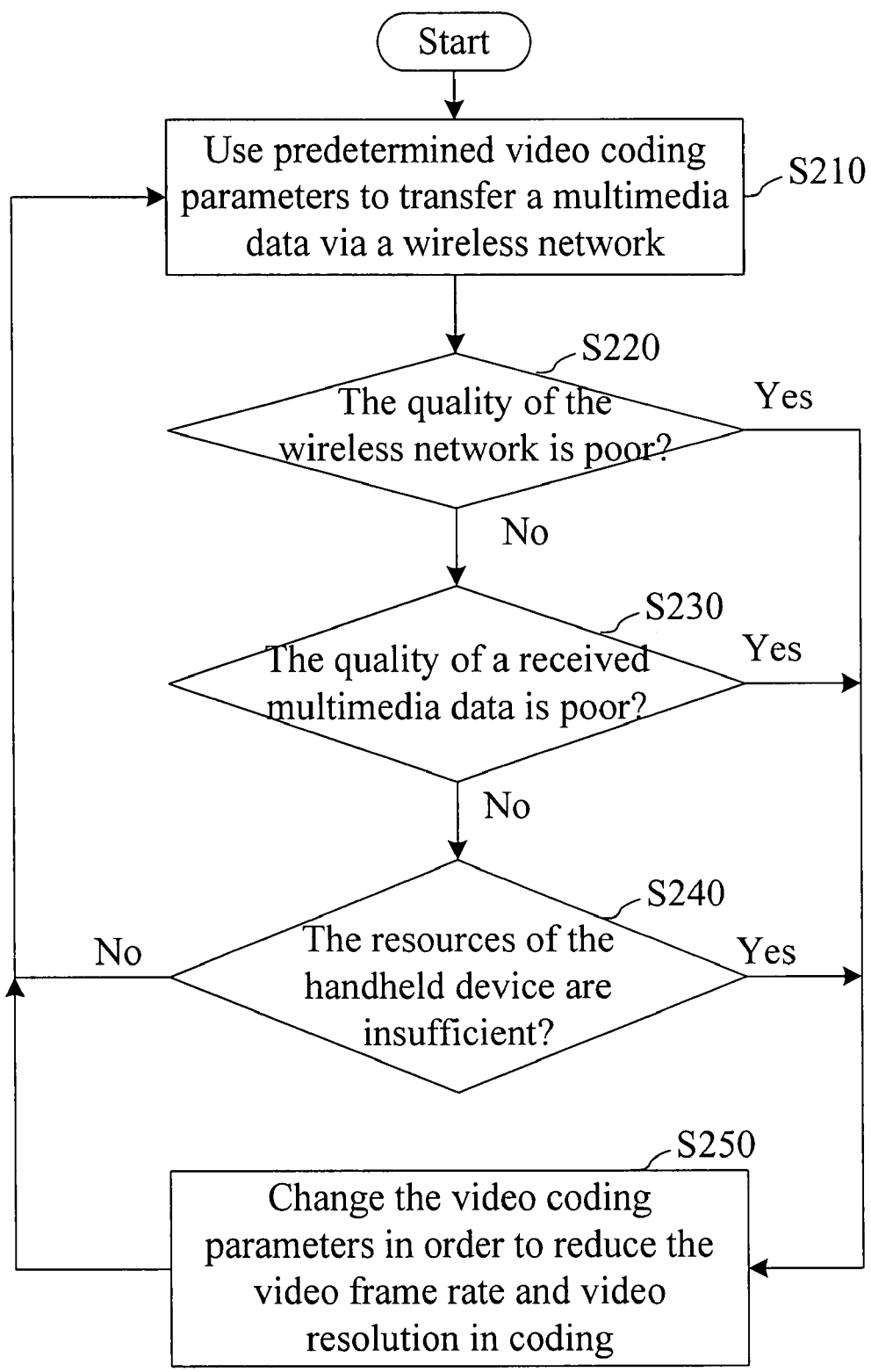
FIG. 2 is a flowchart of a method for controlling multimedia communication quality in a handheld device in accordance with the invention.

FIG. 2 is a flowchart of a method for controlling multimedia communication quality in a handheld device in accordance with the invention. The handheld device receives and transmits multimedia data via a wireless network. As shown in FIG. 2, step S210 codes a video stream and transmit the coded video stream via the wireless network by the predetermined video coding parameters, and receives the multimedia data via the wireless network. Step S220 detects the quality of the wireless network, and then step S250 is executed to change the video coding parameters when the quality of the wireless network is poor, so as to reduce the video frame rate and the video resolution in coding. Step S230 is executed when it is determined that the quality of the wireless network is good.

Step S220 can refer to the signal to noise ratio (SNR), the bit error rate (BER), the radio signal strength indicator (RSSI) or the packet loss rate as the determinants. The system can refer to one or more of the determinants and accordingly determine the quality of the wireless network. For example, the packet loss rate is used to determine the quality of the wireless network. When the packet loss rate is greater than a first threshold, the quality of the wireless network is determined as poor and conversely, good.

S230 detects the quality of a received multimedia data, and then step S250 is executed to change the video coding parameters when the quality of the received multimedia data is poor. The quality of the received multimedia data detected in step S230 includes the frame-delay variation, the bit error rate and the frame loss rate.

When step S230 decides that the quality of the received multimedia data is good, step S240 further determines whether the resources of the handheld device are sufficient. When the resources of the handheld device are insufficient, the video coding parameters are changed (step S250). When step S240 decides that the resources of the handheld device are sufficient, step S210 is executed.

In step S240, the resources of the handheld include the processor load, the residual quantity of power and the used quantity of memory.

In view of the foregoing, it is known that the system and method for controlling multimedia communication quality in a handheld device can overcome the poor video quality in a videoconference of wireless network. The invention can also overcome the problem that the conventional video coding is not suitable for a wireless channel with signal interference and limited bandwidth due to the fixed output stream bit rate and fixed coding parameters. In addition, the invention can provide a QoS guarantee of video in the videoconference of the wireless network.

Although the present invention has been explained in relation to its preferred embodiment, it is to be understood that many other possible modifications and variations can be made without departing from the spirit and scope of the invention as hereinafter claimed.

What is claimed is:

1. A system for controlling multimedia communication quality in a handheld device which receives and transmits multimedia data via a wireless network, the system comprising:
   a transceiver module, which is connected to an air-interface in order to send or receive the multimedia data to or from the air-interface respectively, wherein the air-interface receives and transmits a packet including the multimedia data via the wireless network;
   a network analysis and video control module, which is connected to the transceiver module in order to produce a video coding control signal based on a quality of service (QoS) information, wherein the video coding control signal has a first state indicating that the communication quality of air-interface is good, and a second state indicating that the communication quality of air-interface is poor;
   an encoder, which is connected to the network analysis and video control module, receives a non-coded video datastream for further compressing and coding the non-coded video datastream based on video coding parameters that are adjusted in accordance with the video coding control signal, to thereby produce a transport datastream;
   a video transfer module, which is connected between the encoder and the transceiver module in order to pack the transport datastream to become a transfer format of the transceiver module for being transferred by the transceiver module;
   an image capturing device, which is connected to the encoder in order to capture an image and produce the non-coded video datastream; and
   a video transcoder, which is connected to the network analysis and video control module in order to adjust the video coding parameters based on the video coding control signal, such that a pre-encoded video datastream is transduced into a video datastream with a different video resolution and frame rate than that of the pre-encoded video datastream;
   wherein the different video resolution and frame rate indicates a high video resolution and frame rate when the video coding control signal is at the first state, and a low video resolution and frame rate when the video coding control signal is at the second state.

2. The system as claimed in claim 1, further comprising:
   a dynamic resource management device, which is connected to the network analysis and video control module in order to detect resources of the handheld device to thereby produce a first control signal;
   wherein the network analysis and video control module adjusts the video coding control signal based on the first control signal.

3. The system as claimed in claim 2, wherein the resources of the handheld device include a processor load, a residual quantity of power and a used quantity of memory.

4. The method as claimed in claim 1, further comprising:
   a video receiver module, which is connected to the transceiver module in order to receive a video datastream that is received by the transceiver module from the air-interface; and
   a video quality analysis module, which is connected between the video receiver module and the network analysis and video control module in order to produce a second control signal based on quality of the video datastream received;

wherein the network analysis and video control module adjusts the video coding control signal based on the second control signal.

5. The system as claimed in claim 4, wherein the quality of the video datastream received includes a frame-delay variation, a bit error rate and a frame loss rate.

6. The system as claimed in claim 5, wherein the transceiver module performs a time division multiplexing circuit-switched protocol.

7. The system as claimed in claim 1, wherein the encoder performs an H.263 compressing and coding, an MPEG4 compressing and coding, or an H.264 compressing and coding.

8. The system as claimed in claim 1, wherein the image capturing device is a charge-coupled device (CCD) image sensor or a complementary metal oxide semiconductor (CMOS) image sensor.

9. The system as claimed in claim 1, wherein the network analysis and video control module determines whether a packet loss rate of the wireless network is greater than a first threshold for deciding the quality of the wireless network; and decides that the quality of the wireless network is poor when the packet loss rate is greater than the first threshold, to thereby produce the QoS information.

10. The system as claimed in claim 1, wherein the network analysis and video control module determines whether a signal to noise ratio (SNR) of the wireless network is smaller than a second threshold for deciding the quality of the wireless network; and decides that the quality of the wireless network is poor when the SNR is smaller than the second threshold, to thereby produce the QoS information.

11. The system as claimed in claim 1, wherein the network analysis and video control module determines whether a bit error rate (BER) of the wireless network is greater than a third threshold for deciding the quality of the wireless network; and decides that the quality of the wireless network is poor when the BER is greater than the third threshold, to thereby produce the QoS information.

12. The system as claimed in claim 1, wherein the network analysis and video control module determines whether a radio signal strength indicator (RSSI) of the wireless network is smaller than a fourth threshold for determining the quality of the wireless network; and decides that the quality of the wireless network is poor when the RSSI is smaller than the fourth threshold, to thereby produce the QoS information.

* * * * *